United States Patent
Hofmann et al.

(10) Patent No.: US 10,820,782 B2
(45) Date of Patent: Nov. 3, 2020

(54) HEATING ASSEMBLY FOR A WASHING APPLIANCE

(71) Applicant: Haier US Appliance Solutions, Inc., Wilmington, DE (US)

(72) Inventors: Adam Christopher Hofmann, Louisville, KY (US); Ramasamy Thiyagarajan, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 91 days.

(21) Appl. No.: 15/690,386

(22) Filed: Aug. 30, 2017

(65) Prior Publication Data
US 2019/0059695 A1    Feb. 28, 2019

(51) Int. Cl.
| A47L 15/48 | (2006.01) |
| A47L 15/42 | (2006.01) |
| A47L 15/50 | (2006.01) |
| A47L 15/23 | (2006.01) |

(52) U.S. Cl.
CPC ............ *A47L 15/483* (2013.01); *A47L 15/23* (2013.01); *A47L 15/4225* (2013.01); *A47L 15/4259* (2013.01); *A47L 15/486* (2013.01); *A47L 15/488* (2013.01); *A47L 15/507* (2013.01)

(58) Field of Classification Search
CPC ............ A47L 15/0034; A47L 15/0042; A47L 15/0047; A47L 15/481; A47L 15/483; A47L 15/486; A47L 15/488; A47L 15/4291
See application file for complete search history.

(56) References Cited

U.S. PATENT DOCUMENTS

| 7,604,014 B2 | 10/2009 | Paintner |
| 8,419,865 B2 | 4/2013 | Tarr et al. |
| 9,574,804 B2 | 2/2017 | Dreossi et al. |
| 2006/0254623 A1* | 11/2006 | Classen ................ A47L 15/481 134/56 D |
| 2012/0036902 A1* | 2/2012 | Hong ..................... D06F 29/00 68/5 C |
| 2013/0333238 A1 | 12/2013 | Thiyagarajan |

FOREIGN PATENT DOCUMENTS

| EP | 2309052 B1 | 7/2013 |
| KR | 100652481 | 11/2006 |

OTHER PUBLICATIONS

Machine Translation of Jerg et al., EP 2309052 A1, Apr. 2011. (Year: 2011).*

* cited by examiner

*Primary Examiner* — David G Cormier
(74) *Attorney, Agent, or Firm* — Dority & Manning, P.A.

(57) ABSTRACT

A drying system includes a tub defining a wet chamber, a water storage chamber, an inlet defined in the tub and providing fluid communication into the wet chamber and a heat pipe heat exchanger. The heat pipe heat exchanger includes a condenser section and an evaporator section. The condenser section is in operative communication with the inlet upstream of the wet chamber and the evaporator section is in operative communication with the water storage chamber.

19 Claims, 4 Drawing Sheets

HEATING ASSEMBLY FOR A WASHING APPLIANCE

FIELD

The present subject matter relates generally to washing appliances, such as dishwashing appliances and, more particularly, to a heating assembly of a washing appliance.

BACKGROUND

Dishwashing appliances generally include a tub that defines a wash chamber. Rack assemblies can be mounted within the wash chamber for receipt of articles for washing where, e.g., detergent, water, and heat, can be applied to remove food or other materials from dishes and other articles being washed. Various cycles may be included as part of the overall cleaning process. For example, a typical, user-selected cleaning option may include a wash cycle and rinse cycle (referred to collectively as a wet cycle), as well as a drying cycle. In addition, spray-arm assemblies within the wash chamber may be used to apply or direct fluid towards the articles disposed within the rack assemblies in order to clean such articles.

Fluids used in the cleaning process may be heated. For example, hot water may be supplied to the dishwasher and/or the dishwasher may include one or more heat sources for heating fluids used in wash or rinse cycle and for providing heat during a drying cycle. It is common to provide dishwashers with rod-type, resistive heating elements in order to supply heat within the wash chamber during one or more of the dishwasher cycles (e.g. during the drying cycle). Generally, these heating elements include an electric resistance-type wire that is encased in a ceramic-filled, metallic sheath. The usage of such electric heaters typically leads to increased energy consumption. Moreover, a significant portion of the energy used to heat the water, e.g., for the wash cycle, may be wasted when the hot water is discharged from the dishwasher after being applied to the articles.

Accordingly, an improved heating device for a dishwashing appliance that provides for improved energy usage would be welcomed in the technology.

BRIEF DESCRIPTION

Aspects and advantages of the technology will be set forth in part in the following description, or may be obvious from the description, or may be learned through practice of the technology.

In one embodiment a dishwashing appliance is provided. The dishwashing appliance includes a tub defining a wash chamber, a water storage chamber, an inlet defined in the tub and providing fluid communication into the wash chamber and a heat pipe heat exchanger. The heat pipe heat exchanger includes a condenser section and an evaporator section. The condenser section is in operative communication with the inlet upstream of the wash chamber and the evaporator section is in operative communication with the water storage chamber.

In another embodiment, a drying system is provided. The drying system includes a tub defining a wet chamber, a water storage chamber, an inlet defined in the tub and providing fluid communication into the wet chamber and a heat pipe heat exchanger. The heat pipe heat exchanger includes a condenser section and an evaporator section. The condenser section is in operative communication with the inlet upstream of the wet chamber and the evaporator section is in operative communication with the water storage chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
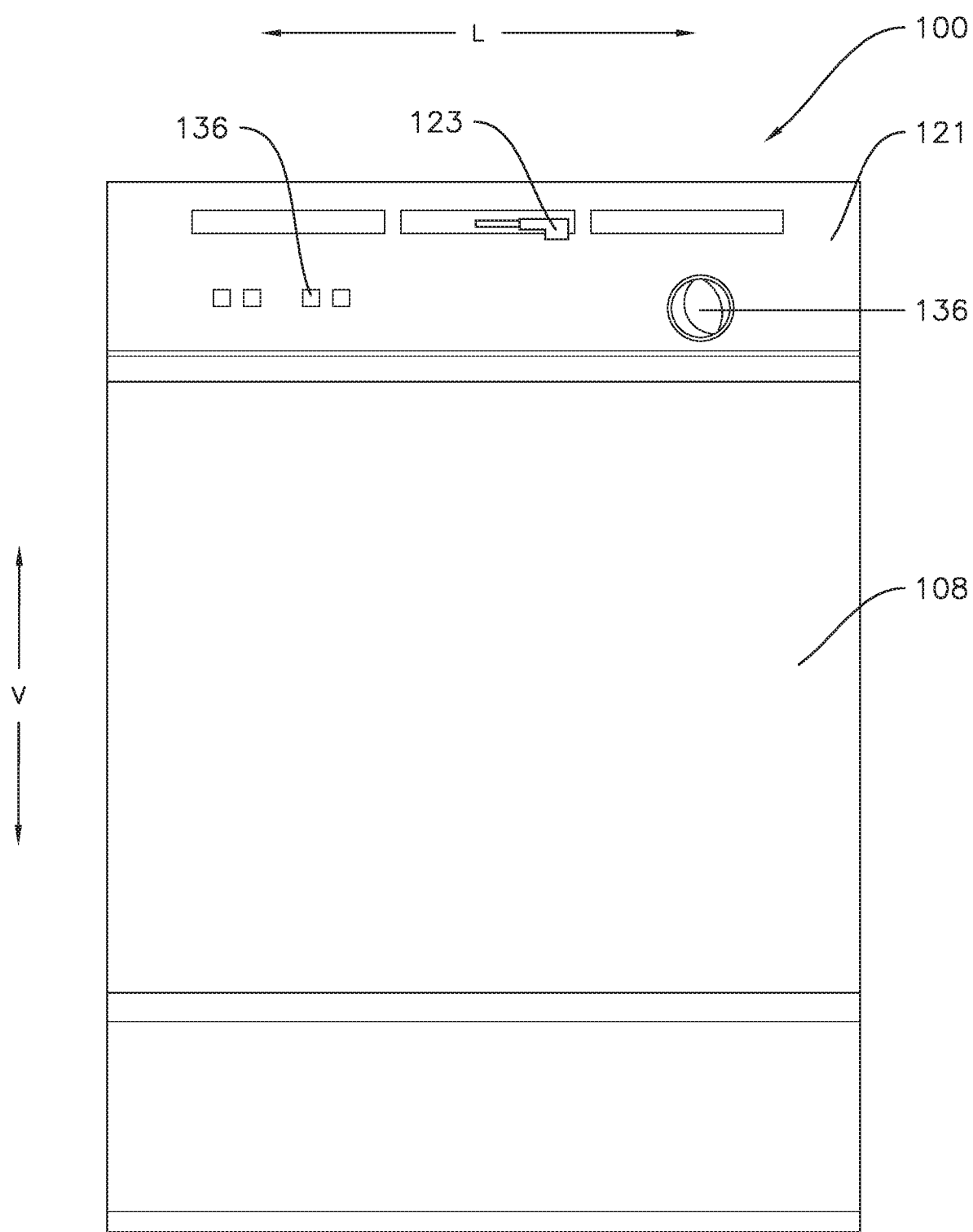
FIG. 1 illustrates a front view of one embodiment of a dishwashing appliance as may incorporate one or more embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 2:
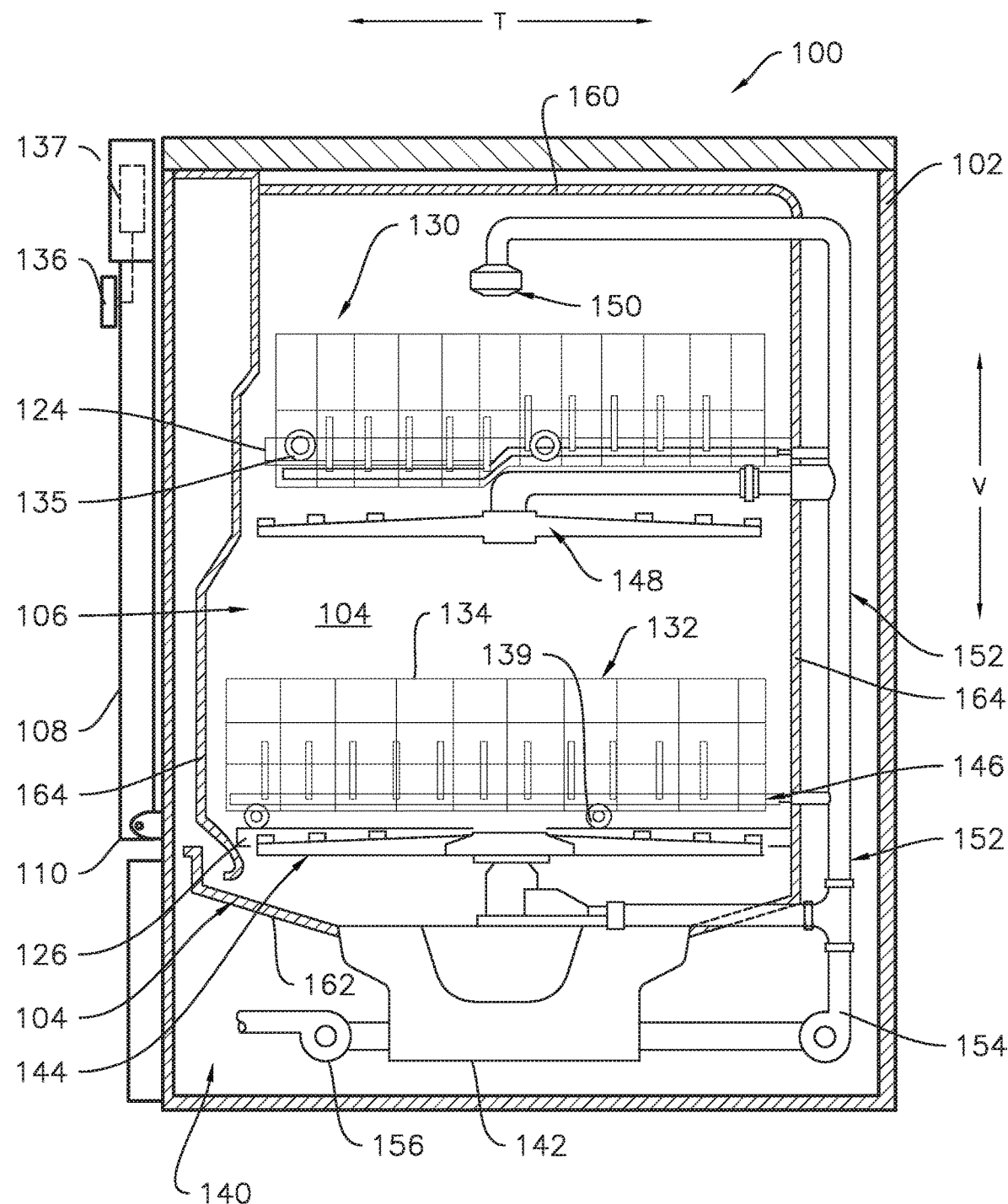
FIG. 2 illustrates a cross-sectional side view of the dishwashing appliance shown in FIG. 1, particularly illustrating various internal components of the dishwashing appliance.

Referring now to the drawings, FIGS. 1 and 2 illustrate one embodiment of a domestic dishwashing appliance 100 that may be configured in accordance with aspects of the present disclosure. As shown in FIGS. 1 and 2, the dishwashing appliance 100 may include a cabinet 102 having a tub 104 therein defining a wash chamber 106. The tub 104 may generally include a front opening (not shown) and a door 108 hinged at its bottom 110 for movement between a normally closed vertical position (shown in FIGS. 1 and 2), wherein the wash chamber 106 is sealed shut for washing operation, and a horizontal open position for loading and unloading of articles from the dishwasher. As shown in FIG.

1, a latch 123 may be used to lock and unlock the door 108 for access to the chamber 106.

As is understood, the tub 104 may generally have a rectangular cross-section defined by various wall panels or walls. For example, as shown in FIG. 2, the tub 104 may include a top wall 160 and a bottom wall 162 spaced apart from one another along a vertical direction V of the dishwashing appliance 100. Additionally, the tub 104 may include a plurality of sidewalls 164 (e.g., four sidewalls) extending between the top and bottom walls 160, 162. It should be appreciated that the tub 104 may generally be formed from any suitable material. However, in several embodiments, the tub 104 may be formed from a ferritic material, such as stainless steel, or a polymeric material.

As particularly shown in FIG. 2, upper and lower guide rails 124, 126 may be mounted on opposing side walls 164 of the tub 104 and may be configured to accommodate roller-equipped rack assemblies 130 and 132. Each of the rack assemblies 130, 132 may be fabricated into lattice structures including a plurality of elongated members 134 (for clarity of illustration, not all elongated members making up assemblies 130 and 132 are shown in FIG. 2). Additionally, each rack 130, 132 may be adapted for movement along a transverse direction T between an extended loading position (not shown) in which the rack is substantially positioned outside the wash chamber 106, and a retracted position (shown in FIGS. 1 and 2) in which the rack is located inside the wash chamber 106. This may be facilitated by rollers 135 and 139, for example, mounted onto racks 130 and 132, respectively. As is generally understood, a silverware basket (not shown) may be removably attached to rack assembly 132 for placement of silverware, utensils, and the like, that are otherwise too small to be accommodated by the racks 130, 132.

Additionally, the dishwashing appliance 100 may also include a lower spray-arm assembly 144 that is configured to be rotatably mounted within a lower region 146 of the wash chamber 106 directly above the bottom wall 162 of the tub 104 so as to rotate in relatively close proximity to the rack assembly 132. As shown in FIG. 2, a mid-level spray-arm assembly 148 may be located in an upper region of the wash chamber 106, such as by being located in close proximity to the upper rack 130. Moreover, an upper spray assembly 150 may be located above the upper rack 130.

As is generally understood, the lower and mid-level spray-arm assemblies 144, 148 and the upper spray assembly 150 may generally form part of a fluid circulation system 152 for circulating fluid (e.g., water and dishwasher fluid which may also include water, detergent, and/or other additives, and may be referred to as wash liquor) within the tub 104. As shown in FIG. 2, the fluid circulation system 152 may also include a recirculation pump 154 located in a machinery compartment 140 below the bottom wall 162 of the tub 104, as is generally recognized in the art, and one or more fluid conduits for circulating the fluid delivered from the pump 154 to and/or throughout the wash chamber 106. The tub 104 may include a sump 142 positioned at a bottom of the wash chamber 106 for receiving fluid from the wash chamber 106. The recirculation pump 154 receives fluid from sump 142 to provide a flow to fluid circulation system 152, which may include a switching valve or diverter (not shown) to select flow to one or more of the lower and mid-level spray-arm assemblies 144, 148 and the upper spray assembly 150.

Moreover, each spray-arm assembly 144, 148 may include an arrangement of discharge ports or orifices for directing washing liquid onto dishes or other articles located in rack assemblies 130 and 132, which may provide a rotational force by virtue of washing fluid flowing through the discharge ports. The resultant rotation of the lower spray-arm assembly 144 provides coverage of dishes and other dishwasher contents with a washing spray.

A drain pump 156 may also be provided in the machinery compartment 140 and in fluid communication with the sump 142. The drain pump 156 may be in fluid communication with an external drain (not shown) to discharge fluid, e.g., used wash liquid, from the sump 142.

The dishwashing appliance 100 may be further equipped with a controller 137 configured to regulate operation of the dishwasher 100. The controller 137 may generally include one or more memory devices and one or more microprocessors, such as one or more general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor.

The controller 137 may be positioned in a variety of locations throughout dishwashing appliance 100. In the illustrated embodiment, the controller 137 is located within a control panel area 121 of the door 108, as shown in FIG. 1. In such an embodiment, input/output ("I/O") signals may be routed between the control system and various operational components of the dishwashing appliance 100 along wiring harnesses that may be routed through the bottom of the door 108. Typically, the controller 137 includes a user interface panel/controls 136 through which a user may select various operational features and modes and monitor progress of the dishwasher 100. In one embodiment, the user interface 136 may represent a general purpose I/O ("GPIO") device or functional block. Additionally, the user interface 136 may include input components, such as one or more of a variety of electrical, mechanical or electro-mechanical input devices including rotary dials, push buttons, and touch pads. The user interface 136 may also include a display component, such as a digital or analog display device designed to provide operational feedback to a user. As is generally understood, the user interface 136 may be in communication with the controller 137 via one or more signal lines or shared communication busses. It should be noted that controllers 137 as disclosed herein are capable of and may be operable to perform any methods and associated method steps as disclosed herein.

It should be appreciated that the present subject matter is not limited to any particular style, model, or configuration of dishwashing appliance. The exemplary embodiment depicted in FIGS. 1 and 2 is simply provided for illustrative purposes only. For example, different locations may be provided for the user interface 136, different configurations may be provided for the racks 130, 132, and other differences may be applied as well.

Figure 3:
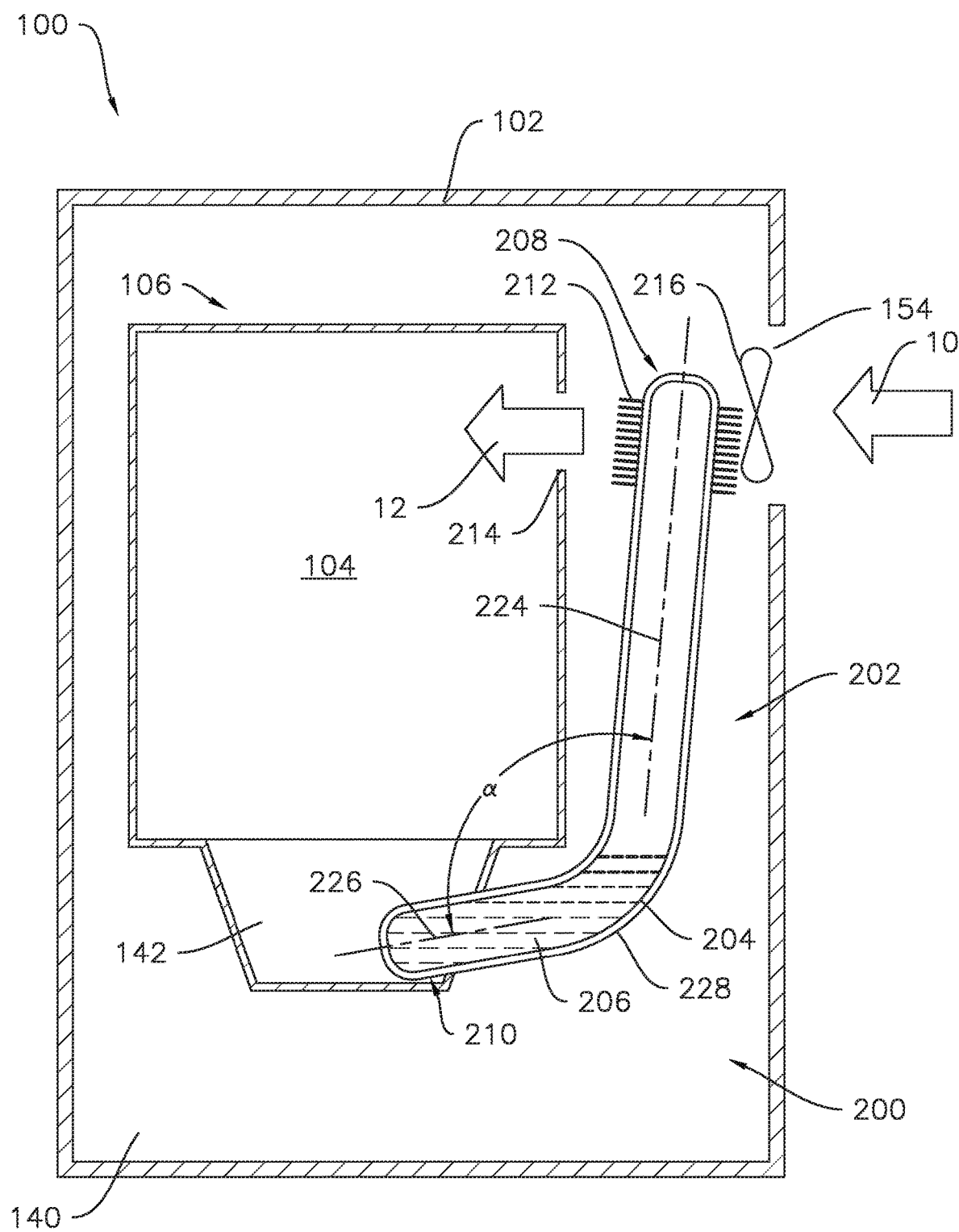
FIG. 3 provides a schematic view of a dishwashing appliance including a drying system according to one or more embodiments of the present subject matter.
Figure 4:
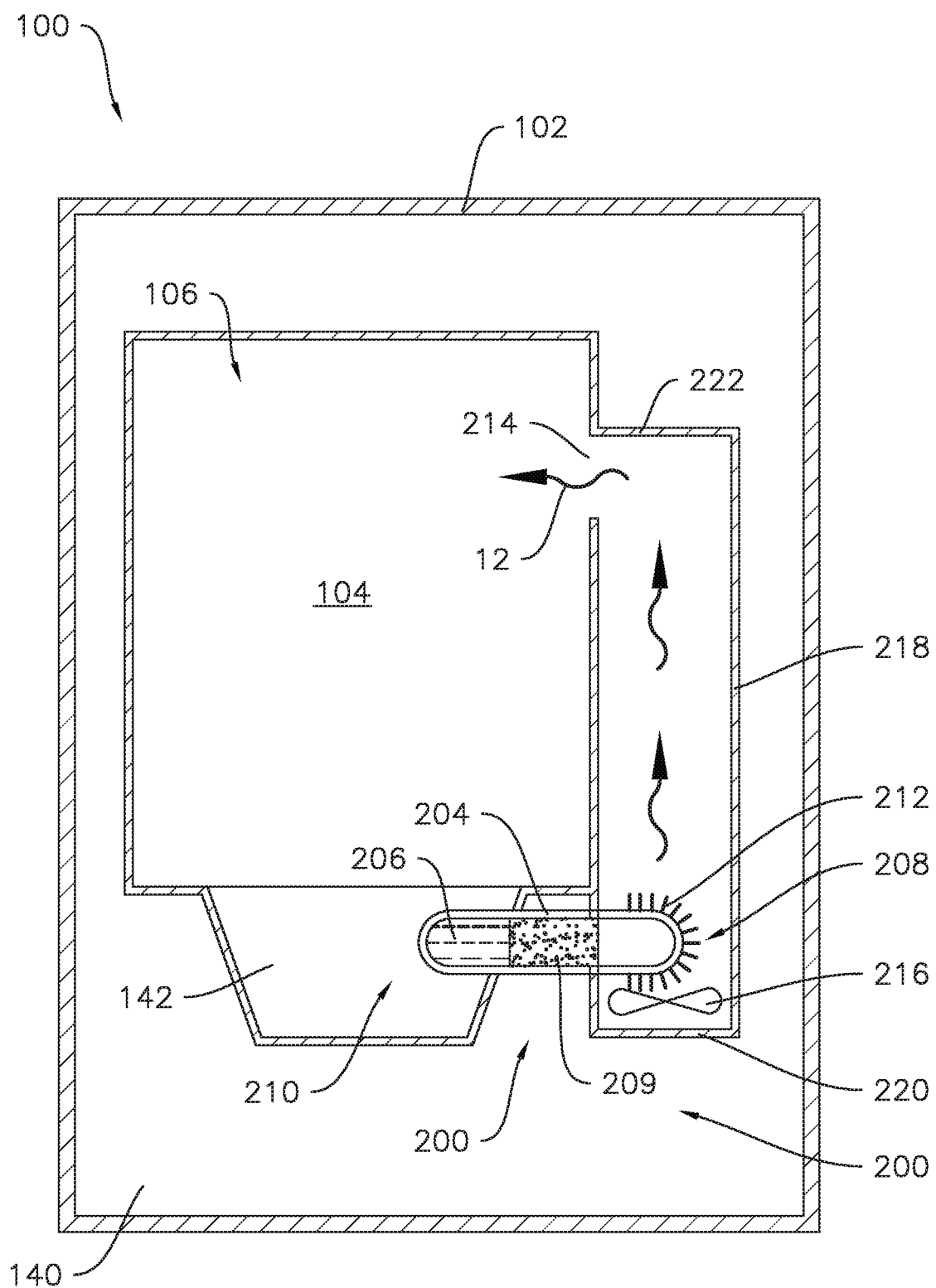
FIG. 4 provides a schematic view of a dishwashing appliance including a drying system according to one or more additional embodiments of the present subject matter.

Turning now to FIGS. 3 and 4, an exemplary drying system 200 may be provided in order to promote drying of a wet chamber and/or of wet articles therein. A heat pipe heat exchanger, hereinafter referred to as a "heat pipe," is an efficient means of transferring thermal energy, e.g., heat, from one location to another. For example, in some embodiments, as illustrated in FIG. 3, the drying system 200 may include heat pipe 202, as described in more detail hereinbelow, which captures heat from liquids, e.g., water, in a water storage chamber at one end and uses the captured heat for heating an air stream on the other end. For example, in some embodiments, the wet chamber may be the wash chamber 106 of dishwashing appliance 100 and wet articles, e.g., dishes, may be located therein. In such embodiments, the water storage chamber may be the sump 142 of the dishwashing appliance 100. In embodiments where the drying system 200 is provided as part of a dishwashing appliance 100, the heat pipe 202 may advantageously be the only heat source for the drying cycle, e.g., the dishwasher appliance 100 may not include a resistance heating element and/or may not use a resistance heating element during the drying cycle. Further, in such embodiments wherein the drying system 200 is part of dishwasher appliance 100, the operation of the dishwasher appliance 100 may include holding liquid in the sump 142 during the drying cycle. That is, rather than activating the drain pump 156 (FIG. 2) shortly after the wet cycle is complete and draining out the hot liquid from the sump 142, the liquid may be retained within the appliance, e.g., within the sump 142 of dishwasher appliance 100 in order to extract thermal energy from the liquid for the drying cycle before discharging the liquid from the sump 142.

In additional embodiments, the drying system 200 may be provided in other appliances or devices, such as a clothes dryer appliance, desiccator, or any other appliance or device wherein drying is desired.

The heat pipe 202 includes a sealed casing 204 containing a working fluid 206 in the casing 204. In some embodiments, the working fluid 206 may be water. In other embodiments, suitable working fluids for the heat pipe 202 include acetone, methanol, ethanol, or toluene. In other embodiments, any suitable fluid may be used for working fluid 206, e.g., that is compatible with the material of the casing 204 and is suitable for the desired operating temperature range. The heat pipe 202 extends between a condenser section 208 and an evaporator section 210. The working fluid 206 contained within the casing 204 of the heat pipe 202 absorbs thermal energy at the evaporator section 210, whereupon the working fluid 206 travels in a gaseous state from the evaporator section 210 to the condenser section 208. The gaseous working fluid 206 condenses to a liquid state and thereby releases thermal energy at the condenser section 208. A plurality of fins 212 may be provided on an exterior surface of the casing 204 at one or both of the condenser section 208 and the evaporator section 210. The fins 212 may provide an increased contact area between the heat pipe 202 and air flowing around the heat pipe 202 for improved transfer of thermal energy. Thus, the fins 212 are more advantageous at the condenser section 208 which is operable to provide heat to the air stream, as opposed to the evaporator section 210 which is operable to absorb heat from liquids.

The heat pipe 202 may include an internal wick structure 209 (FIG. 4) to transport liquid working fluid 206 from the condenser section 208 to the evaporator section 210 by capillary flow. In some embodiments, the heat pipe 202 may be constructed and arranged such that the liquid working fluid 206 returns to the evaporator section 210 solely by gravity flow. For example, as illustrated in FIG. 3, the heat pipe 202 may be arranged such that the condenser section 208 is positioned above the evaporator section 210 along the vertical direction V whereby condensed working fluid 206 in a liquid state may flow from the condenser section 208 to the evaporator section 210 by gravity. In such embodiments, where the liquid working fluid 206 may return to the evaporator section 210 by gravity, the wick structure 209 may be omitted. Thus, the embodiment of FIG. 3 may advantageously provide a reduced cost and simpler heat pipe 202 by omitting the wick structure 209. Other embodiments, such as is illustrated in FIG. 4 may advantageously provide a relatively shorter overall length heat pipe 202 which may promote an increased efficiency of thermal transfer as compared to a longer heat pipe. The length of the heat pipe 202 may generally be defined with respect to the distance, along the shape of the heat pipe 202, between the condenser section 208 and the evaporator section 210, e.g., the distance that the working fluid 206 may travel in operation of the heat pipe 202.

The drying system 200 may be in fluid communication with an ambient environment externally around the loop drying system 200, e.g., in embodiments where the drying system 200 is provided in dishwasher appliance 100, the ambient environment around, e.g., in close proximity to, an exterior of the dishwashing appliance 100, such as the immediate surroundings of the dishwashing appliance 100 from which air may be drawn directly into an intake 154. The drying system 200 is also in fluid communication with a wet chamber, e.g., wash chamber 106 of dishwashing appliance 100, and thus drying system 200 may provide fluid communication between the chamber 106 and the ambient environment.

As illustrated in FIGS. 3 and 4, the tub 104 may include an inlet 214 defined in the tub 104. The inlet 214 may provide fluid communication into the wet chamber, e.g., the wash chamber 106 in embodiments where the drying system 200 is provided in a dishwashing appliance 100. The drying system 200 may also include a fan 216 configured to urge hot air 12 through the inlet 214. For example, in some embodiments, the fan 216 may be configured to urge air from an ambient environment through the inlet 214, e.g., as illustrated in FIG. 3. As another example, in other embodiments, the fan 216 may be configured to urge air from a heating conduit 218 through the inlet 214, e.g., as illustrated in FIG. 4. In various embodiments, the condenser section 208 of the heat pipe 202 may be in operative communication with the inlet 214 upstream of the wet chamber, e.g., chamber 106. For example, as illustrated in FIG. 3, the condenser section 208 may be positioned at or proximate to the inlet 214. In other embodiments, for example as illustrated in FIG. 4, the condenser section 208 may be spaced apart from the inlet 214 and in operative communication with the inlet 214 via an intermediate structure, such as the heating conduit 218 illustrated in FIG. 4. The evaporator section 210 of the heat pipe 202 may be in operative communication with the water storage chamber, e.g., sump 142.

The flow of hot dry air 12 may travel through the wet chamber, e.g., in embodiments where the wet chamber is wash chamber 106, to promote drying of dishes or other articles located in rack assemblies 130 and 132 within the wash chamber 106, whereupon the hot dry air 12 imparts thermal energy to and receives moisture from the articles and/or the wash chamber 106. As used herein, "hot air" includes air having a temperature of at least about 90° F., such as at least about 100° F., such as between about 100° F. and about 160° F., such as between about 115° F. and about 155° F., such as about 135° F. As used herein, terms of approximation, such as "generally," or "about" include values within ten percent greater or less than the stated value. For example, "about 135° F." includes from 121.5° F. to 148.5° F. As used herein, "dry air" includes air having a relative humidity less than about twenty percent, such as less than about fifteen percent, such as less than about ten percent, such as less than about five percent, such as about zero.

In some embodiments, for example as illustrated in FIG. 3, the inlet 214 may be in fluid communication with the ambient environment, e.g., via intake 154. The inlet 214 may be in direct fluid communication with the wet chamber, e.g., wash chamber 106, and the condenser section 208 of the heat pipe 202 may be positioned proximate to the inlet 214. In such embodiments, where the inlet 214 is in fluid communication with the ambient atmosphere, ambient air 10 may pass through intake 154, e.g., the ambient air 10 may be urged from the ambient environment through the intake 154 by the fan 216, such that the ambient air 10 passes over and around the condenser section 208 to provide a flow of hot dry air 12 to the wet chamber, e.g., wash chamber 106. Where the evaporator section 210 of the heat pipe 202 is in operative communication with the water storage chamber, the temperature of the hot dry air 12 will be approximately the same as the temperature of the liquid in the sump 142, depending at least in part on the efficiency of the heat pipe 202. For example, where the water storage chamber is a sump 142 of dishwasher appliance 100, the temperature of the wash liquid stored in the sump may be about 150° F. to about 160° F. In such embodiments, depending on the dimensions of the heat pipe 202, e.g., the length and diameter of the heat pipe 202, and the type of working fluid 206, the hot air 12 may be anywhere within the temperature ranges set forth above, but will generally be less than the temperature of the liquid in the water storage chamber, e.g., sump 142.

As illustrated for example in FIG. 3, the heat pipe 202 may include a bend 228 between the condenser section 208 and the evaporator section 210. The bend 228 may define an arcuate shape, as shown in FIG. 3. The bend 228 is preferably not a sharp bend. As illustrated for example in FIG. 3, the condenser section 208 and the evaporator section 210 may be disposed at an angle α. The sharpness of the bend 228 may be defined by or proportional to the angle α. The angle α is supplementary to the bend angle defined by bend 228. The angle α may be the angle subtended by the arcuate bend 228. As shown in FIG. 3, the tub 106 is positioned within the interior of the angle α. The angle α may be greater than ninety degrees. In particular, the condenser section 208 may define a centerline 224, and the evaporator section 210 may define a centerline 226, where the angle α may be defined between the centerlines 224 and 226. The centerline 224 of the condenser section 208 may be within about fifteen degrees of the vertical direction V, such as about ten degrees from the vertical direction V, and/or may form an angle of at least five degrees with respect to the vertical direction V. In particular, the centerline 224 of the condenser section 208 may diverge from the vertical direction V, e.g., as the heat pipe 202 extends away from the bend 228 towards the condenser section 208, the distance between the tub 104 and the heat pipe 202 may increase. Similarly, the centerline 226 of the evaporator section 210 may be within about fifteen degrees of a horizontal direction, e.g., one of the lateral direction L or the transverse direction T, such as about ten degrees from the horizontal direction, and/or may form an angle of at least five degrees with respect to the horizontal direction. In particular, the centerline 226 of the evaporator section 210 may diverge from the horizontal direction, e.g., as the heat pipe 202 extends away from the bend 228 towards the evaporator section 210, the distance between the tub 104 and the heat pipe 202 may increase. In various embodiments, the condenser section 208 may be oriented along the vertical direction V and the evaporator section 210 may be oriented along one of the lateral direction L or the transverse direction T; or, one or both of the condenser section 208 and the evaporator section 210 may diverge from the respective direction as described above. Where the angle α is greater than ninety degrees, the bend 228 is less sharp than if the angle α were ninety degrees or less, which may advantageously provide improved flow between the condenser section 208 and the evaporator section 210. The angle α may be considered an internal angle of the heat pipe 202. The angle α may be the smallest angle defined between the centerline 224 of the condenser section 208 and the centerline 226 of the evaporator section 210. The angle α may be measured between the centerline 224 of the condenser section 208 and the centerline 226 of the evaporator section 210 in a direction that passes through the tub 106.

One of skill in the art will recognize that the heat pipe 202 may be activated when the fan 216 operates, e.g., when the fan 216 urges ambient air 10 about the condenser section 208 such that thermal energy is transferred from the condenser section 208 to the air 10. As the working fluid 206 in the condenser section 208 becomes relatively cool the working fluid 206 will condense and flow in liquid form to the evaporator section 210, e.g., by gravity and/or capillary flow. Thus, as one of ordinary skill would recognize, the heat transfer may be initiated upon activating the fan 216 and thereby activating the heat pipe 202. Accordingly, at times when transfer of heat from the liquid in the sump 142 is not desired, e.g., during a wash cycle of the dishwasher appliance 100, the heat pipe 202 may be inactive when the fan 216 is not operating.

As illustrated for example in FIG. 4, in some embodiments, the drying system 200 may include a heating conduit 218 extending between the water storage chamber, e.g., sump 142, and the inlet 214. The heating conduit 218 may be configured to provide a flow of air to the condenser section 208 of the heat pipe 202. Thus, it is to be understood that the heating conduit 218 is generally not in fluid communication with the sump 142 such that liquid from the sump 142 generally will not enter the heating conduit 218. The heating conduit 218 may be in thermal communication with the sump 142, in particular when the fan 216 is operating such that the heat pipe 202 is activated, the heating conduit 218 may be in thermal communication with the sump 142 via the heat pipe 202. Thus, the heating conduit 218 may be in fluid communication with the inlet 214 and may be in thermal communication with the sump 142. As such, the heating conduit 218 may provide thermal communication between the sump 142 and the inlet 214. The heating conduit 218 may provide thermal communication between the heat pipe 202 and the inlet 214 into the wash chamber 106. The heating conduit 218 may provide fluid communication, e.g., in the form of a stream of air 12, from the condenser section 208 of the heat pipe 202 to the inlet 214 of the tub 104. The heating conduit 218 may include an upstream end 220 and a downstream end 222 spaced apart from the upstream end 220. The condenser section 208 of the heat pipe 202 may be positioned at the upstream end 220 of the heating conduit 218. The fan 216 may be positioned proximate to the condenser section 218, e.g., the fan 216 may be positioned in the upstream end 220 of the heating conduit 218. The downstream end 222 of the heating conduit 218 may be positioned at the inlet 214, e.g., the downstream end 222 may be in direct fluid communication with the inlet 214.

As noted above, the heat pipe 202 may be activated when the fan 216 operates, e.g., when the fan 216 urges air 12 through the heating conduit 218 such that thermal energy is drawn from the condenser section 208.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwashing appliance, comprising:
a tub defining a wash chamber;
a water storage chamber;
an inlet defined in the tub and providing fluid communication into the wash chamber;
a fan configured to urge air through the inlet; and
a heat pipe heat exchanger comprising a sealed casing containing a working fluid therein, a condenser section defined by a first end of the sealed casing and an evaporator section defined by a second end of the sealed casing opposite the first end, the sealed casing extending continuously from the first end to the second end, the condenser section positioned upstream of the inlet and in convective thermal communication with the wash chamber through the inlet, the evaporator section in direct thermal communication with the water storage chamber.

2. The dishwashing appliance of claim 1, wherein the water storage chamber comprises a sump positioned at a bottom of the wash chamber for receiving fluid from the wash chamber.

3. The dishwashing appliance of claim 1, wherein the fan is configured to urge air from an ambient environment external to the dishwashing appliance through the inlet.

4. The dishwashing appliance of claim 1, wherein the fan is configured to urge air from a heating conduit through the inlet.

5. The dishwashing appliance of claim 1, further comprising a heating conduit extending between the water storage chamber and the inlet.

6. The dishwashing appliance of claim 5, wherein the heating conduit comprises an upstream end and a downstream end spaced apart from the upstream end, the condenser section of the heat pipe heat exchanger positioned at the upstream end of the heating conduit and the downstream end of the heating conduit positioned at the inlet.

7. The dishwashing appliance of claim 1, wherein the condenser section of the heat pipe heat exchanger is positioned proximate to the inlet.

8. The dishwashing appliance of claim 7, wherein the condenser section and the evaporator section are disposed at an angle defined between a centerline of the condenser section and a centerline of the evaporator section, the angle greater than ninety degrees.

9. The dishwashing appliance of claim 7, wherein the heat pipe heat exchanger comprises a bend between the condenser section and the evaporator section.

10. The dishwashing appliance of claim 9, wherein the bend defines an arcuate shape comprising an arc that extends from a first endpoint in the condenser section to a second end point in the evaporator section.

11. The dishwashing appliance of claim 1, wherein the dishwashing appliance defines a vertical direction, the condenser section of the heat pipe heat exchanger positioned above the evaporator section of the heat pipe heat exchanger along the vertical direction such that condensed working fluid flows from the condenser section to the evaporator section by gravity.

12. The dishwashing appliance of claim 1, wherein the heat pipe heat exchanger is the only heat source in the dishwashing appliance for air entering the wash chamber through the inlet.

13. A drying system comprising:
a tub defining a wet chamber;
a water storage chamber;
an inlet defined in the tub and providing fluid communication into the wet chamber; and
a heat pipe heat exchanger comprising a sealed casing containing a working fluid therein, a condenser section defined by a first end of the sealed casing and an evaporator section defined by a second end of the sealed casing opposite the first end, the sealed casing extending continuously from the first end to the second end, the condenser section positioned upstream of the inlet and in convective thermal communication with the wet chamber through the inlet, the evaporator section in direct thermal communication with the water storage chamber;
wherein the heat pipe heat exchanger is the only heat source in the drying system for air entering the wet chamber through the inlet.

14. The drying system of claim 13, wherein the wet chamber is a wash chamber of a dishwasher appliance and the water storage chamber comprises a sump positioned at a bottom of the wash chamber for receiving fluid from the wash chamber.

15. The drying system of claim 13, wherein the condenser section and the evaporator section are disposed at an angle defined between a centerline of the condenser section and a centerline of the evaporator section, the angle greater than ninety degrees.

16. The drying system of claim 13, further comprising a fan configured to urge air from an ambient environment external to the dishwashing appliance through the inlet.

17. The drying system of claim 13, further comprising a heating conduit extending between the water storage chamber and the inlet.

18. The drying system of claim 17, further comprising a fan configured to urge air from the heating conduit through the inlet.

19. The drying system of claim 13, wherein the condenser section of the heat pipe heat exchanger is positioned proximate to the inlet.

* * * * *